United States Patent
Roychoudhury et al.

(10) Patent No.: US 12,174,639 B2
(45) Date of Patent: Dec. 24, 2024

(54) METHODS AND SYSTEM FOR GOAL-CONDITIONED EXPLORATION FOR OBJECT GOAL NAVIGATION

(71) Applicant: Tata Consultancy Services Limited, Mumbai (IN)

(72) Inventors: Ruddra Dev Roychoudhury, Kolkata (IN); Brojeshwar Bhowmick, Kolkata (IN); Madhava Krishna Krishnan, Hyderabad (IN); Gulshan Kumar, Hyderabad (IN); Sai Shankar Narasimhan, Hyderabad (IN); Himansu Didwania, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 233 days.

(21) Appl. No.: 17/813,262

(22) Filed: Jul. 18, 2022

(65) Prior Publication Data
US 2023/0080342 A1 Mar. 16, 2023

(30) Foreign Application Priority Data
Aug. 6, 2021 (IN) .............................. 202121035596

(51) Int. Cl.
*G05D 1/00* (2024.01)
*G06V 10/22* (2022.01)
(Continued)

(52) U.S. Cl.
CPC .......... *G05D 1/0246* (2013.01); *G05D 1/0278* (2013.01); *G06V 10/22* (2022.01);
(Continued)

(58) Field of Classification Search
CPC .... G05D 1/0246; G05D 1/0278; G06N 20/00; G06N 3/0464; G06N 3/09; G06N 5/01;
(Continued)

(56) References Cited

U.S. PATENT DOCUMENTS

| 2004/0178942 A1* | 9/2004 | McLemore | ............ G01S 7/285 342/28 |
| 2019/0369205 A1* | 12/2019 | Lee | ........................ G01S 5/0081 |

(Continued)

OTHER PUBLICATIONS

Devendra Singh Chaplot et al. "Neural Topological SLAM for Visual Navigation", CVPR 2020, May 28, 2020, pp. 1-14 (Year: 2020).*

(Continued)

*Primary Examiner* — Thomas Ingram
*Assistant Examiner* — Michael J Herrera
(74) *Attorney, Agent, or Firm* — Finnegan, Henderson, Farabow, Garrett & Dunner, LLP

(57) ABSTRACT

In state of the art methods for object goal navigation, scene understanding is implicit in their goal oriented exploration policies. Implicit scene understanding coupled with navigation is shown to be specific to tasks for which training is done and not generalizable to new tasks. Thus, embodiments of present disclosure propose a method of goal-conditioned exploration wherein scene understanding is decoupled from the exploration policies. Here, the scene understanding required for navigation is provided by a region classification network that is trained using semantic graphs representing the scene and agent can be navigated towards the goal either by using any state of the art pure exploration policies or by traversing through potential sub-goals identified based on a Co-occurrence Likelihood score calculated by using predictions from the region classification network. Hence, the method of present disclosure can be easily generalized to new tasks and new environments.

15 Claims, 11 Drawing Sheets

(51) Int. Cl.
*G06V 10/764* (2022.01)
*G06V 10/774* (2022.01)
*G06V 10/82* (2022.01)
*G06V 20/70* (2022.01)

(52) U.S. Cl.
CPC .......... *G06V 10/764* (2022.01); *G06V 10/774* (2022.01); *G06V 20/70* (2022.01); *G06V 10/82* (2022.01)

(58) Field of Classification Search
CPC ...... G06N 5/022; G06V 10/22; G06V 10/764; G06V 10/774; G06V 10/82; G06V 20/70
See application file for complete search history.

(56) References Cited

U.S. PATENT DOCUMENTS

| | | | | |
|---|---|---|---|---|
| 2021/0165413 A1* | 6/2021 | Guo | .................. | G01S 19/42 |
| 2022/0108546 A1* | 4/2022 | Xu | .................. | G06N 5/02 |
| 2022/0196798 A1* | 6/2022 | Chen | .................. | G01S 13/89 |
| 2022/0390920 A1* | 12/2022 | Wang | .................. | B23K 31/003 |
| 2023/0005178 A1* | 1/2023 | Liu | .................. | G06N 3/0442 |
| 2023/0039466 A1* | 2/2023 | Sternitzke | .................. | B66B 1/468 |

OTHER PUBLICATIONS

Zhu, Fengda et al., "SOON: Scenario Oriented Object Navigation with Graph-based Exploration", Computer Vision and Pattern Recognition, Date: 2021, Publisher: Arxiv, https://arxiv.org/pdf/2103.17138.pdf.

Ye, Xin et al., "Hierarchical and Partially Observable Goal-driven Policy Learning with Goals", Relational Graph of the item: Computation and Language—Robotic, Date: Mar. 2021, Publisher: Arxiv, https:/arxiv.org/pdf/2103.01350.pdf.

Chaplot, Devendra Singh et al., "Object Goal Navigation using Goal-Oriented Semantic Exploration information extraction", Computation and Language—Robotic, Date: Jul. 2020, Publisher: Arxiv, https://srxiv.org/pdf/2007.00643.pdf.

Georgakis, Georgios et al., "Learning to Map for Active Semantic Goal Navigation", Computation and Language—Robotic, Date: Mar. 2022, Publisher: Arxiv, https://arxiv.org/pdf/2106.15648.pdf.

Chaplot, Devendra Singh et al., "Learning To Explore Using Active Neural Slam", Computation and Language—Robotic, Date: Apr. 2020, Publisher: Arxiv, https://arxiv.org/pdf/2004.05155.pdf.

* cited by examiner

METHODS AND SYSTEM FOR GOAL-CONDITIONED EXPLORATION FOR OBJECT GOAL NAVIGATION

PRIORITY CLAIM

This U.S. patent application claims priority under 35 U.S.C. § 119 to: Indian Patent Application No. 202121035596, filed on Aug. 6, 2021. The entire contents of the aforementioned application are incorporated herein by reference.

TECHNICAL FIELD

The disclosure herein generally relates to the field of embodied Artificial Intelligence (AI), and, more particularly, to methods and system for goal-conditioned exploration for object goal navigation.

BACKGROUND

Recent research trends in Artificial Intelligence (AI), Machine Learning (ML), and Computer Vision (CV) have led to a growing research space called Embodied AI. Simply put, "Embodied AI" means "AI for virtual robots". More specifically, Embodied AI is the field for solving AI problems for virtual robots that can move, see, speak, and interact in the virtual world and with other virtual robots. These simulated robot solutions are then transferred to real world robots. Embodied AI tasks are enabled by scene understanding, interaction with the environment and long-term planning. In the last decade, there has been significant progress in vision and language models which can be used by embodied agents to understand and interact with the environment to perform real-world tasks such as 'find a towel'. The tasks maybe straightforward to humans but for a robot to execute such a task in an unexplored environment, object detection or semantic segmentation alone is insufficient. 3D scene understanding of likely places to find the goal object (e.g., towel) is critical in these tasks.

Object goal navigation is one such embodied AI task wherein an agent (alternatively referred as robot) must reach the specified goal object (alternatively referred as goal), in an unexplored environment, within a defined number of time-steps. For executing the task, an accurate scene understanding is essential to identify areas where the goal is likely to occur. The task is largely viewed as an end-to-end target driven reinforcement learning problem wherein Recurrent Neural Networks (RNNs) have been employed to develop long-term memory of the 3D scene. Some research works execute object goal navigation as a modular learning based system wherein goal oriented semantic exploration policy is trained to generate long-term goals that explore regions where the goal is likely to occur. It is evident that for a good solution to object goal navigation, it is necessary to explore the likely regions where the goal category can be found. In order to identify the likely regions, an accurate understanding of the semantic region the agent currently is in, the agent's surrounding semantic regions and the probability of the goal category occurring in each of these semantic regions is necessary. In state-of-the-art methods for object goal navigation, scene understanding is implicit in their goal-oriented exploration policies. Implicit scene understanding coupled with navigation is shown to be specific to tasks for which training is done and not generalizable to new tasks.

SUMMARY

Embodiments of the present disclosure present technological improvements as solutions to one or more of the above-mentioned technical problems recognized by the inventors in conventional systems. For example, in one embodiment, a method for goal-conditioned exploration for object goal navigation is provided. The method includes receiving an image of a goal and a pre-defined number of time instances within which the agent must reach the goal. The goal refers to an object of interest among a plurality of objects in a plurality of regions within an environment of the agent. Further, the method includes initializing the agent at a random location within a region among the plurality of regions. Further, a spatial occupancy map and a semantic graph corresponding to the random location are constructed. Further, the method includes performing a plurality of steps for each of the pre-defined number of time instances or until the agent reaches the goal, wherein the plurality of steps comprises obtaining a plurality of sensory inputs from a plurality of sensors associated with the agent and updating the spatial occupancy map and the semantic graph based on the plurality of sensory inputs. The semantic graph comprises one or more objects among the plurality of objects. Further, the plurality of steps comprise predicting a region class probability vector corresponding to each object in the semantic graph using a region classification network. The region class probability vector indicates probability of the object occurring in each of the plurality of regions. Further, the plurality of steps comprise computing a Co-occurrence Likelihood (CL) score for each object in the semantic graph as product of the corresponding region class probability vector and a goal distribution vector and identifying potential sub-goals based on the CL score. The CL score indicates likelihood of the object and the goal occurring together in a region among the plurality of regions. Furthermore, the plurality of steps include performing one of—(a) navigating the agent towards closest potential sub-goal among the identified potential sub-goals if one or more potential sub-goals are identified, and (b) navigating the agent towards a long-term goal based on the spatial occupancy map, wherein the long-term goal is selected from an exploration policy.

In another aspect, a system for goal-conditioned exploration for object goal navigation is provided is provided. The system includes an RGB-D camera; one or more GPS-compass sensors; one or more depth sensors; a memory storing instructions; one or more communication interfaces; and one or more hardware processors coupled to the memory, RGB-D camera, GPS-compass sensor(s) and depth sensor(s) via the one or more communication interfaces, wherein the one or more hardware processors are configured by the instructions to: receive an image of a goal and a pre-defined number of time instances within which the agent must reach the goal. The goal refers to an object of interest among a plurality of objects in a plurality of regions within an environment of the agent. Further, the one or more hardware processors are configured to initialize the agent at a random location within a region among the plurality of regions. Further, a spatial occupancy map and a semantic graph corresponding to the random location are constructed. Further, the one or more hardware processors are configured to perform a plurality of steps for each of the pre-defined number of time instances or until the agent reaches the goal, wherein the plurality of steps comprises obtaining a plurality of sensory inputs from a plurality of sensors associated with the agent and updating the spatial occupancy map and the semantic graph based on the plurality of sensory inputs. The semantic graph comprise one or more objects among the plurality of objects. Further, the plurality of steps comprise predicting a region class probability vector corresponding to each object in the semantic graph using a region classification network. The region class probability vector indicates probability of the object occurring in each of the plurality of regions. Further, the plurality of steps comprise computing a Co-occurrence Likelihood (CL) score for each object in the semantic graph as product of the corresponding region class probability vector and a goal distribution vector and identifying potential sub-goals based on the CL score. The CL score indicates likelihood of the object and the goal occurring together in a region among the plurality of regions. Furthermore, the plurality of steps include performing one of—(a) navigating the agent towards closest potential sub-goal among the identified potential sub-goals if one or more potential sub-goals are identified, and (b) navigating the agent towards a long-term goal based on the spatial occupancy map, wherein the long-term goal is selected from an exploration policy.

In yet another aspect, there are provided one or more non-transitory machine-readable information storage mediums comprising one or more instructions which when executed by one or more hardware processors cause a method for goal-conditioned exploration for object goal navigation. The method includes receiving an image of a goal and a pre-defined number of time instances within which the agent must reach the goal. The goal refers to an object of interest among a plurality of objects in a plurality of regions within an environment of the agent. Further, the method includes initializing the agent at a random location within a region among the plurality of regions. Further, a spatial occupancy map and a semantic graph corresponding to the random location are constructed. Further, the method includes performing a plurality of steps for each of the pre-defined number of time instances or until the agent reaches the goal, wherein the plurality of steps comprises obtaining a plurality of sensory inputs from a plurality of sensors associated with the agent and updating the spatial occupancy map and the semantic graph based on the plurality of sensory inputs. The semantic graph comprise one or more objects among the plurality of objects. Further, the plurality of steps comprise predicting a region class probability vector corresponding to each object in the semantic graph using a region classification network. The region class probability vector indicates probability of the object occurring in each of the plurality of regions. Further, the plurality of steps comprise computing a Co-occurrence Likelihood (CL) score for each object in the semantic graph as product of the corresponding region class probability vector and a goal distribution vector and identifying potential sub-goals based on the CL score. The CL score indicates likelihood of the object and the goal occurring together in a region among the plurality of regions. Furthermore, the plurality of steps include performing one of—(a) navigating the agent towards closest potential sub-goal among the identified potential sub-goals if one or more potential sub-goals are identified, and (b) navigating the agent towards a long-term goal based on the spatial occupancy map, wherein the long-term goal is selected from an exploration policy.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
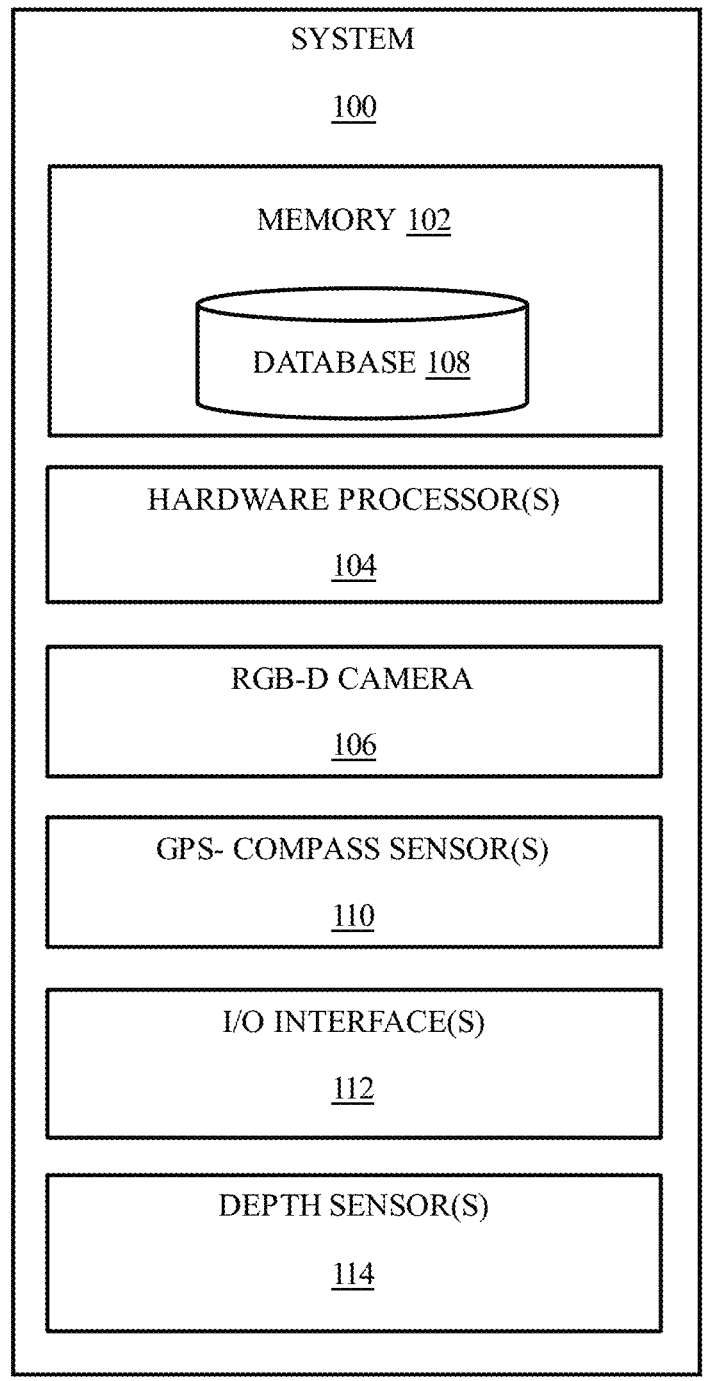
FIG. 1 illustrates an exemplary system for goal-conditioned exploration for object goal navigation, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Object goal navigation is an embodied AI task wherein an agent (alternatively referred as robot) must reach any instance of the specified goal category, in an unexplored environment, within a defined number of time-steps. Typically, the agent is initialized at a random location in an unseen environment and is tasked to reach any instance of the object goal category G. The agent has an RGB-D camera and noiseless GPS—Compass sensor. Each episode begins with the agent spawning at a random location and given a target goal category. The episode terminates as a failure after a predefined number of timesteps when the goal is not reached. At any given timestep t in an episode, the agent must map the sensor inputs $I_t$ to the action space. The action space consists of the actions move_forward, turn_left, turn_right, stop. The episode is termed as a success if the agent reaches within a threshold distance d from any instance of the goal category G. Traditional methods of object goal navigation majorly made use of geometric maps. These maps were either assumed to be known in prior (L. Matthies et al, "Error modeling in stereo navigation," IEEE Journal on Robotics and Automation, vol. 3, no. 3, pp. 239-248, 1987; J. Borenstein et al., "The vector field histogram-fast obstacle avoidance for mobile robots," IEEE transactions on robotics and automation, vol. 7, no. 3, pp. 278-288, 1991), or were built as the agent moved and explored (S. Thrun, "Learning metric-topological maps for indoor mobile robot navigation," Artificial Intelligence, vol. 99, no. 1, pp. 21-71, 1998; H. J. S. Feder, J. J. Leonard, and C. M. Smith, "Adaptive mobile robot navigation and mapping," The International Journal of Robotics Research, vol. 18, no. 7, pp. 650-668, 1999; E. S. Jones and S. Soatto, "Visual-inertial navigation, mapping and localization: A scalable real-time causal approach," The International Journal of Robotics Research, vol. 30, no. 4, pp. 407-430, 2011). Location to be visited by agent was selected from the map using a heuristic method such as frontier based exploration (B. Yamauchi, "A frontier-based approach for autonomous exploration," in Proceedings 1997 IEEE International Symposium on Computational Intelligence in Robotics and Automation CIRA'97. 'Towards New Computational Principles for Robotics and Automation'. IEEE, 1997, pp. 146-151). Some of the earliest works in Object Search include (K. Desingh, A. Nagariya, and K. M. Krishna, "Viewpoint based mobile robotic exploration aiding object search in indoor environment," in The Eighth Indian Conference on Vision, Graphics and Image Processing, ICVGIP '12, Mumbai, India, Dec. 16-19, 2012, B. Triggs, K. Bala, and S. Chandran, Eds. ACM, 2012, p. 18) wherein a real-time search for objects was materialized in the presence of a known map and known potential locations such as tables where objects can be found. A viewpoint maximizing approach was shown to be successful in searching for the most likely agent viewpoints from which objects have maximum possibilities of being detected. In (M. S. Karthik, S. Mittal, G. Malik, and K. M. Krishna, "Decision theoretic search for small objects through integrating far and near cues," in 2015 European Conference on Mobile Robots (ECMR). IEEE, 2015, pp. 1-6.) a method that integrates both far and near cues in a decision theoretic framework was proposed.

Some recent deep learning and reinforcement learning based approaches make use of a single model which predicts actions directly from inputs. (P. Mirowski, R. Pascanu, et al., "Learning to navigate in complex environments," arXiv preprint arXiv:1611.03673, 2016; and T. Chen, S. Gupta, and A. Gupta, "Learning exploration policies for navigation," in International Conference on Learning Representations, 2019) proposed frameworks to train models for predicting actions from visual inputs using RL. Different frameworks for predicting actions directly from a set of inputs were also presented in (W. Yang, X. Wang, et al., "Visual semantic navigation using scene priors," 2019; Y. Qiu, A. Pal, and H. I. Christensen, "Learning hierarchical relationships for object-goal navigation," in The Conference on Robotic Learning, Boston, MA, November 2020). In contrast to these approaches, embodiments of present disclosure take a modular approach which decouples different aspects of navigation.

Modular approach for navigation has been used to break the navigation framework into multiple components. This has been explored in (D. S. Chaplot, D. Gandhi, et al., "Learning to explore using active neural slam," in International Conference on Learning Representations (ICLR), 2020; Y. Wu, Y. Wu, et al., "Bayesian relational memory for semantic visual navigation," in Proceedings of the IEEE/CVF International Conference on Computer Vision, 2019, pp. 2769-2779; N. Savinov, A. Dosovitskiy, and V. Koltun, "Semi-parametric topological memory for navigation," in International Conference on Learning Representations, 2018; D. S. Chaplot, R. Salakhutdinov, A. Gupta, and S. Gupta, "Neural topological slam for visual navigation," in CVPR, 2020) where first a long term subgoal is selected by a global policy. Then, a local policy predicts action to reach the subgoal. In the mentioned works, both these modules are learnable.

Although metric maps for representing environment has remained popular in recent works (T. Chen, S. Gupta, and A. Gupta, "Learning exploration policies for navigation," in International Conference on Learning Representations, 2019; D. S. Chaplot, D. Gandhi, et al., "Learning to explore using active neural slam," in International Conference on Learning Representations (ICLR), 2020; and D. S. Chaplot, D. Gandhi, A. Gupta, and R. Salakhutdinov, "Object goal navigation using goal-oriented semantic exploration," in In Neural Information Processing Systems, 2020), use of topological representation has been approached in (Y. Wu, Y. Wu, et al., "Bayesian relational memory for semantic visual navigation," in Proceedings of the IEEE/CVF International Conference on Computer Vision, 2019, pp. 2769-2779; N. Savinov, A. Dosovitskiy, and V. Koltun, "Semi-parametric topological memory for navigation," in International Conference on Learning Representations, 2018; D. S. Chaplot, R. Salakhutdinov, A. Gupta, and S. Gupta, "Neural topological slam for visual navigation," in CVPR, 2020; N. Sünderhauf, "Where are the keys?—learning object-centric navigation policies on semantic maps with graph convolutional networks," arXiv preprint arXiv:1909.07376, 2019). The research work (D. S. Chaplot, R. Salakhutdinov, A. Gupta, and S. Gupta, "Neural topological slam for visual navigation," in CVPR, 2020) stores locations of environment as nodes, from which a node was selected as subgoal using a learned scoring function. (N. Savinov, A. Dosovitskiy, and V. Koltun, "Semi-parametric topological memory for navigation," in International Conference on Learning Representations, 2018;) built an internal representation of environment during an exploratory phase and used this to traverse the environment. (Y. Wu, Y. Wu, et al., "Bayesian relational memory for semantic visual navigation," in Proceedings of the IEEE/CVF International Conference on Computer Vision, 2019, pp. 2769-2779; E. Beeching, J. Dibangoye, O. Simonin, and C. Wolf, "Learning to plan with uncertain topological maps," in Computer Vision—ECCV 2020, A. Vedaldi, H. Bischof, T. Brox, and J.-M. Frahm, Eds. Cham: Springer International Publishing, 2020, pp. 473-490) used the training phase to build a probabilistic understanding of scene, which was exploited to navigate through unseen environments. In (N. Süderhauf, "Where are the keys?—learning object-centric navigation policies on semantic maps with graph convolutional networks," arXiv preprint arXiv:1909.07376, 2019), a graph convolution network trained using RL was used to predict the probability of finding the target for every node.

Unlike the existing approaches, the embodiments of present disclosure use object graph (alternately referred as semantic graph) to predict region categories associated with every node and utilize these predictions to locate regions likely to contain the goal. The policies for goal oriented navigation can be broadly divided into two categories—pure exploration and goal driven exploration. The goal exploration policies falling into the latter class are trained to implicitly encode the scene priors and develop scene understanding. The present disclosure proposes a goal-conditioned exploration method wherein an agent can navigate using any pure exploration policies and the scene understanding required for navigation is provided by a region classification network that is trained using semantic graphs representing the scene.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 illustrates an exemplary system for goal-conditioned exploration for object goal navigation, according to some embodiments of the present disclosure. In an embodiment, the system 100 represents an agent or a robot and includes one or more processors 104, an RGB-D camera 106, one or more GPS-compass sensors 110, communication interface device(s) or Input/Output (I/O) interface(s) 112, one or more depth sensors 114 and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 112 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. In an embodiment, object goal category (alternatively referred as goal) is taken as input from a user via the I/O interface device(s) 112 and result of object goal navigation (success or failure) is displayed to the user via the I/O interface device(s) 112.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The database 108 may store information but not limited to information associated with at least one of: (i) one or more semantic graphs, (ii) one or more spatial occupancy maps, (iii) region classification network and so on. Further, the database 108 stores information pertaining to inputs fed to the system 100 and/or outputs generated by the system (e.g., at each stage), specific to the methodology described herein. Functions of the components of system 100 are explained in conjunction with flow diagrams depicted in FIGS. 2, 3 and 4, and examples illustrated in FIGS. 5-8 for goal conditioned exploration for object goal navigation.

Figure 2:
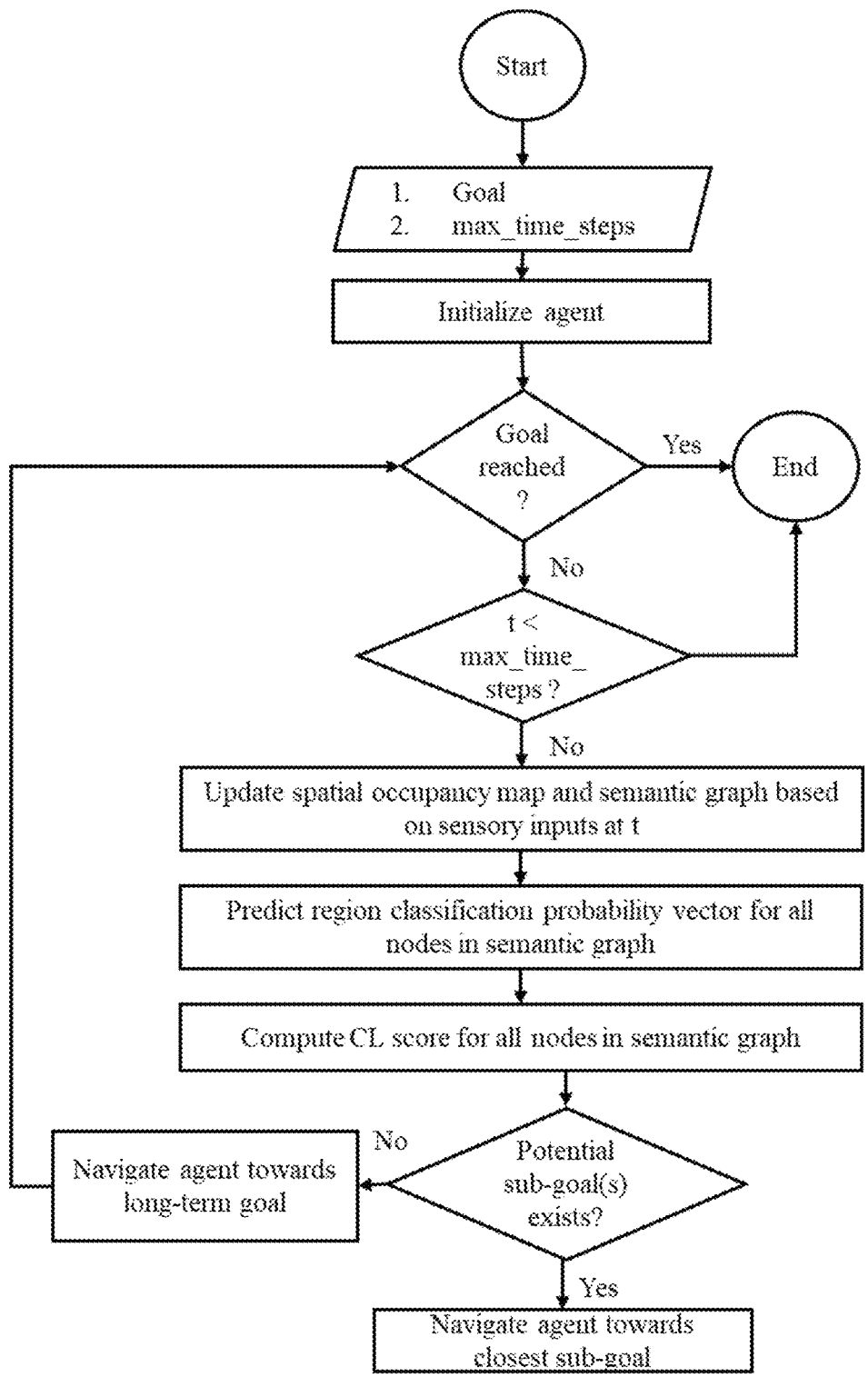
FIG. 2 illustrates an exemplary flow diagram for goal-conditioned exploration for object goal navigation, according to some embodiments of the present disclosure.
Figure 3A:
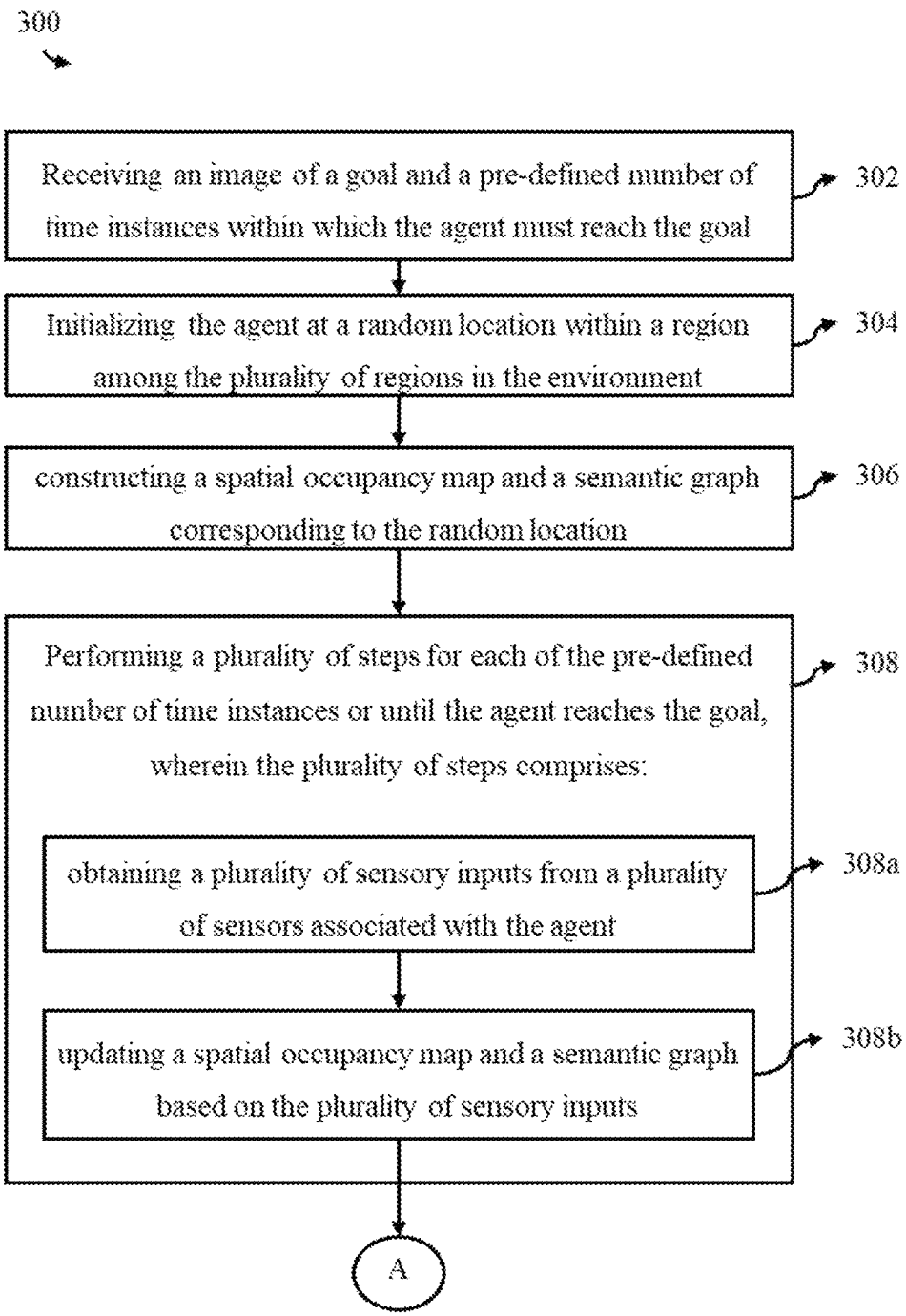
FIGS. 3A and 3B collectively referred to as FIG. 3 is a flowchart illustrating a method for goal-conditioned exploration of the agent using system of FIG. 1, according to some embodiments of the present disclosure.
Figure 3B:
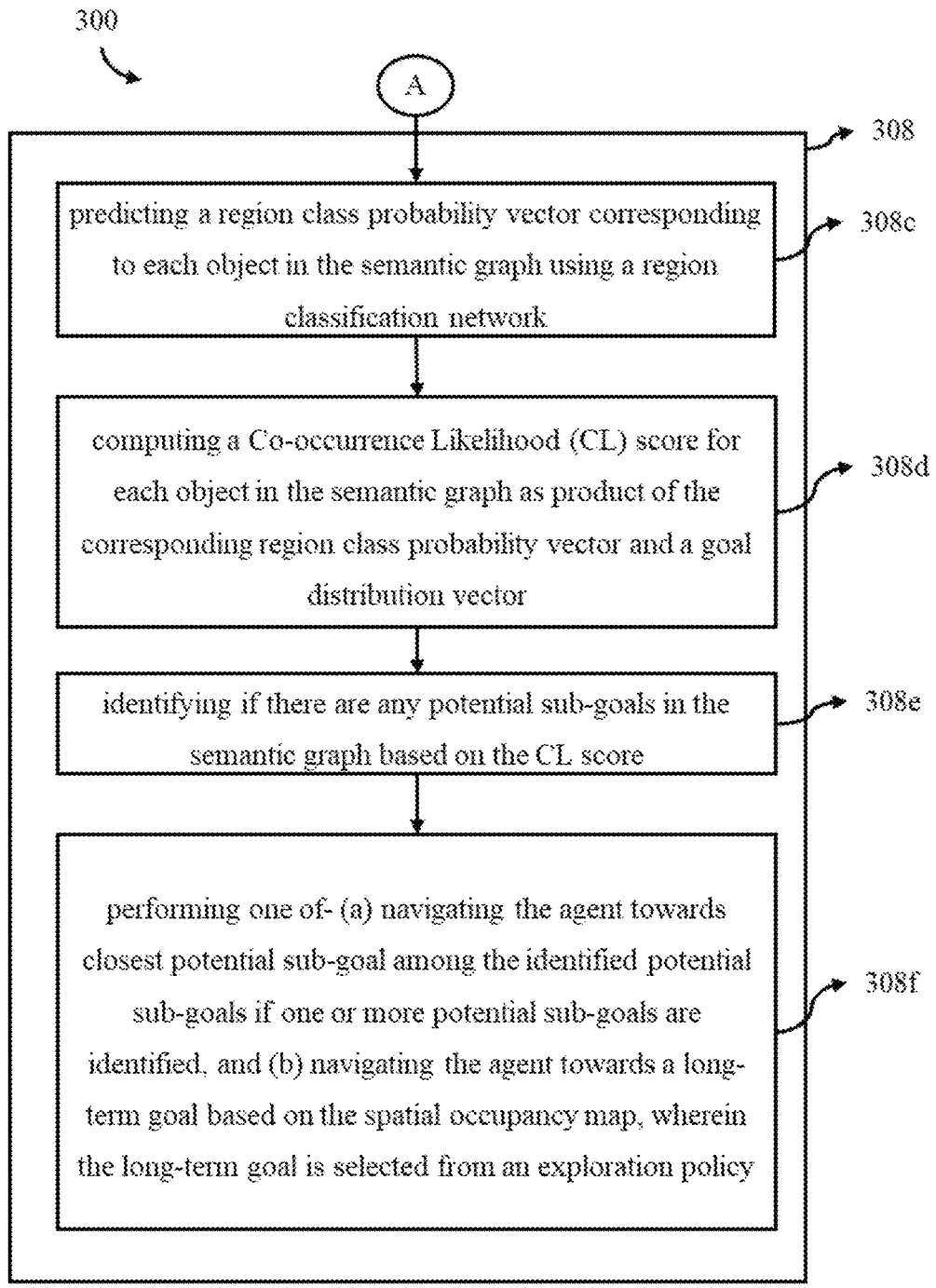
Figure 4:
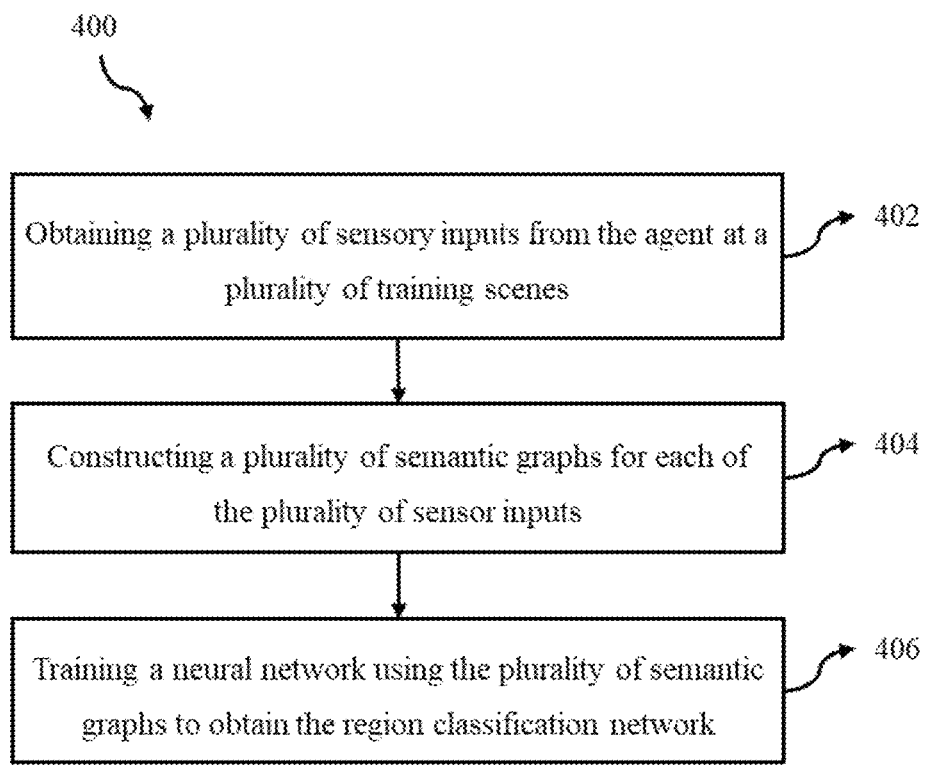
FIG. 4 is a flowchart illustrating a process of training a region classification network, according to some embodiments of the present disclosure.

FIG. 2 illustrates an exemplary flow diagram for goal-conditioned exploration for object goal navigation, according to some embodiments of the present disclosure. FIG. 2 depicts the overall process flow of the system 100 and is explained in conjunction with FIG. 3, which is a flowchart illustrating a method (300) for goal-conditioned exploration of the agent (system of FIG. 1), according to some embodiments of the present disclosure. In an embodiment, the system 100 comprises one or more data storage devices or the memory 102 operatively coupled to the processor(s) 104 and is configured to store instructions for execution of steps of the method depicted in FIGS. 2, 3 and 4 by the processor(s) or one or more hardware processors 104. The steps of the method of the present disclosure will now be explained with reference to the components or blocks of the system 100 as depicted in FIG. 1, the steps of flow diagrams as depicted in FIGS. 2, 3 and 4, and examples illustrated in FIGS. 5-8. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The method 300 described herein can be used to navigate a real robot towards a goal. However, since experimenting on a real robot involves high cost, the method 300 has been implemented on a simulator such as Habitat (M. Savva, A. Kadian, et al., "Habitat: A platform for embodied ai research," in Proceedings of the IEEE/CVF International Conference on Computer Vision, 2019, pp. 9339-9347) or AI2-THOR (M. Deitke, W. Han, et al., "RoboTHOR: An Open Simulation-to-Real Embodied AI Platform," in CVPR, 2020). At step 302 of the method 300, one or more hardware processors of the agent are configured to obtain an image of a goal and a pre-defined number of time instances (max_time_steps) within which the agent must reach the goal. The goal refers to an object of interest among a plurality of objects in a plurality of regions within an environment of the agent. For example, the goal may be a chair or a bed. In an embodiment, the goal is specified by a user. Further, at step 304 of the method 300, the one or more hardware processors are configured to initialize the agent at a random location within a region among the plurality of regions.

Further, at step 306 of the method 300, the one or more hardware processors are configured to construct a spatial occupancy map and a semantic graph corresponding to the random location. In an embodiment, the semantic graph is constructed by considering objects identified from sensory inputs obtained from the agent as nodes and connecting each node (objects) to its K nearest objects identified by K-Nearest Neighbors (KNN) algorithm. For example, if value of K is considered as 5, then, each node of the semantic graph will be connected to 5 neighboring nodes identified by KNN algorithm. As understood by a person skilled in the art, KNN is a clustering algorithm which groups data points (objects herein) based on distance between the data points. The sensory inputs are obtained by the agent at a current location in which the agent is in. In real word, the objects are identified from inputs from RGB camera and depth sensor using techniques known in the art whereas in simulation experiments, the objects are identified from semantic sensor inputs provided by the simulator in which the agent is simulated. In an embodiment, the spatial occupancy map is a grid map comprising a plurality of grid cells corresponding to the plurality of regions in the environment. The grid cells are marked as occupied or unoccupied based on sensory inputs obtained by the agent at a current location in which the agent is in.

Further, at step 308 of the method 300, the one or more hardware processors are configured to perform a plurality of steps 308a-308f for each of the pre-defined number of time instances or until the agent reaches the goal. In an embodiment, step 308 may be configured to terminate if the agent reaches within a pre-defined threshold distance from the goal. At step 308a, a plurality of sensory inputs from a plurality of sensors associated with the agent are obtained. The plurality of sensory inputs comprise RGB images of a current location in which the agent is in, which is captured by the RGB-D camera 106. The plurality of sensory inputs further comprise sensory inputs from the GPS-compass sensor 110 and depth sensor 114. Further, at step 308b, a spatial occupancy map and a semantic graph are updated based on the plurality of sensor inputs. The spatial occupancy map and the semantic graph comprise one or more objects among a plurality of objects in the environment. In an embodiment, each object may belong to an object category. For example, if chair is an object category, then, different chairs occurring in different regions are considered as objects belonging to 'chair' object category. In other words, chair found in kitchen, chair found in dining room, chair found in living room etc. are considered as different objects belonging to 'chair' object category. The spatial occupancy map is updated using a method disclosed in (D. S. Chaplot, D. Gandhi, et al., "Learning to explore using active neural slam," in International Conference on Learning Representations (ICLR), 2020). In an embodiment, the semantic graph is updated by adding new nodes if any new objects are identified from the plurality of sensor inputs. Further, at step 308c, a region class probability vector is predicted for each object in the semantic graph using the region classification network. The region class probability vector indicates probability of occurrence of an object at each of the plurality of regions. In an embodiment, the region classification network is trained using the process 400 illustrated in FIG. 4.

Figure 7:
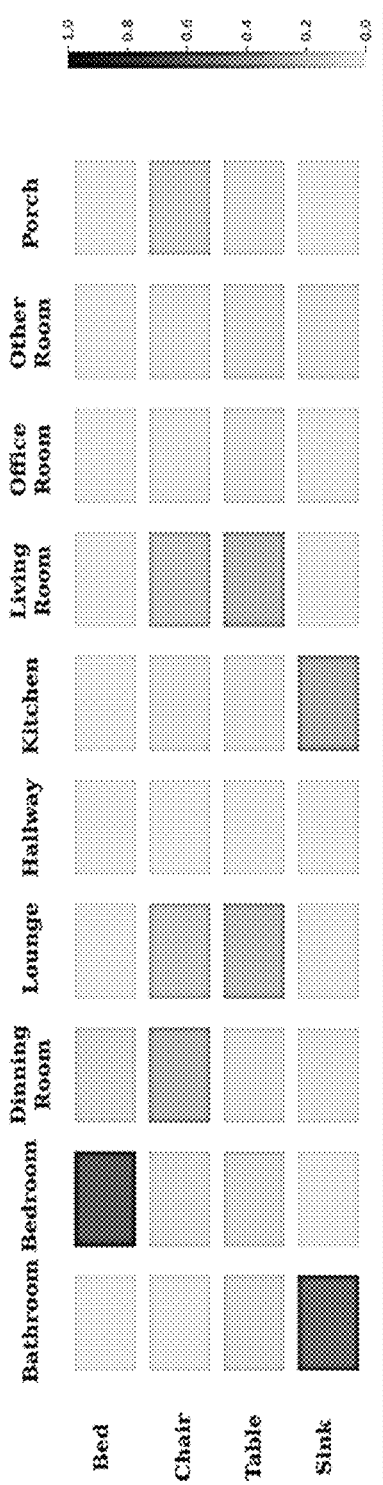
FIG. 7 illustrates an example goal distribution vector, according to some embodiments of the present disclosure.

Further, at step 308d a Co-occurrence Likelihood (CL) score for each object in the semantic graph is computed as product of the corresponding region class probability vector and a goal distribution vector computed a priori. In an embodiment, the CL score for an object o (represented by node in the semantic graph) quantifies the likelihood of the goal G occurring in the object's neighborhood. The CL score also indicates probability of the object and the goal occurring together. Mathematically, CL score can be calculated by equation 1.

$$\text{CL score} = \Sigma_{r=0}^{N_R-1} p(o \text{ in region}[r]) \cdot p(G \text{ in region}[r]) \quad (1)$$

wherein region={bedroom, kitchen, . . . } is list of the plurality of regions in the environment, $N_R$ is the total number of regions, o is the object corresponding to which CL score is calculated, and G is the goal. p(o in region[r]) is the region class probability vector corresponding to the object for which CL score is calculated and is determined in the step 308c. p(G in region[r]) is the goal distribution vector computed a priori by analyzing distribution of goal G in region[r] based on how many times the goal has occurred in the region. For example, suppose there are 5 regions in an environment and a bed has occurred in a bedroom 9 times out of 10, once in the living room, and no time in other 3 regions, then goal distribution vector for the bed will be [0.9, 0.1, 0, 0, 0]. The sum of values of a goal distribution vector is always 1 for each object, as it is a probability distribution. Also, the number of values in the goal distribution vector is equal to the number of regions in the environment. FIG. 7 illustrates an example goal distribution vector, according to some embodiments of the present disclosure. The equation 1 can alternatively be expressed by a vector representation as in equation 2:

$$\text{CL score} = p_r \cdot g_{apriori} \quad (2)$$

wherein $p_r \in \mathbb{R}^{N_R}$ is the region class probability vector and $g_{apriori} \in \mathbb{R}^{N_R}$ is the goal distribution vector. In an embodiment, the value of CL score ranges from 0 to 1. A high CL score for an object o indicates that likelihood of the goal G occurring in o's neighborhood is high.

Returning to method 300, step 308e identifies if there are any potential sub-goals in the semantic graph, wherein the potential sub-goals have CL score greater than a pre-defined threshold value. As understood by a person skilled in the art, the potential sub-goals are the nodes of the semantic graph towards which the agent has to navigate in order to reach the goal G. The pre-defined threshold value can be determined based on the goal distribution vector. For example, if value of the goal distribution vector for one region is higher than that of a second region, then, the threshold value can be defined in such a way that the agent is conditioned to move towards the first region.

Further, step 308f performs one of—(a) navigating the agent towards closest potential sub-goal among the identified potential sub-goals if one or more potential sub-goals are identified; and (b) navigating the agent towards a long-term goal based on the spatial occupancy map. In an embodiment, the long term goal is selected from an exploration policy. Thus, a person skilled in the art can infer that if the pre-defined threshold value is high, then, navigation of the agent is dependent on the exploration policy. Similarly, if the pre-defined threshold value is low, then, most of the region classes are identified as potential sub goals where the goal G occurs. Hence, the pre-defined threshold value can vary degree of exploration between these two extremes, and it is important to define a suitable threshold value. FIG. 7 shows that goals like chair and table occur across almost every region whereas goals like bed and sink occur in only one or two regions. Therefore, it is sufficient to explore less for the former and it is necessary to explore more for the latter. This can be achieved by defining the threshold as a function of the goal distribution vector, $g_{apriori}$.

At the step 308f, the long-term goal selected from an exploration policy gives an intermediate goal in the form of a point on the spatial occupancy map. The point coordinates are interpreted by the agent and a navigation policy is decided based on that. For example, in Active Neural SLAM (ANS), the explored area, the robot position and position of obstacles is fed to a Neural Network and it returns the long term goal for the robot to navigate to. Once the long term goal is determined, the spatial occupancy map is used to plan a path to that goal. As understood by a person skilled in the art, path planning can be performed in various ways. For example, path planning can be done by the Habitat Shortest Path planner for the Frontier Based exploration policy or Fast Marching Motion Planner for the ANS exploration policy.

Figure 5:
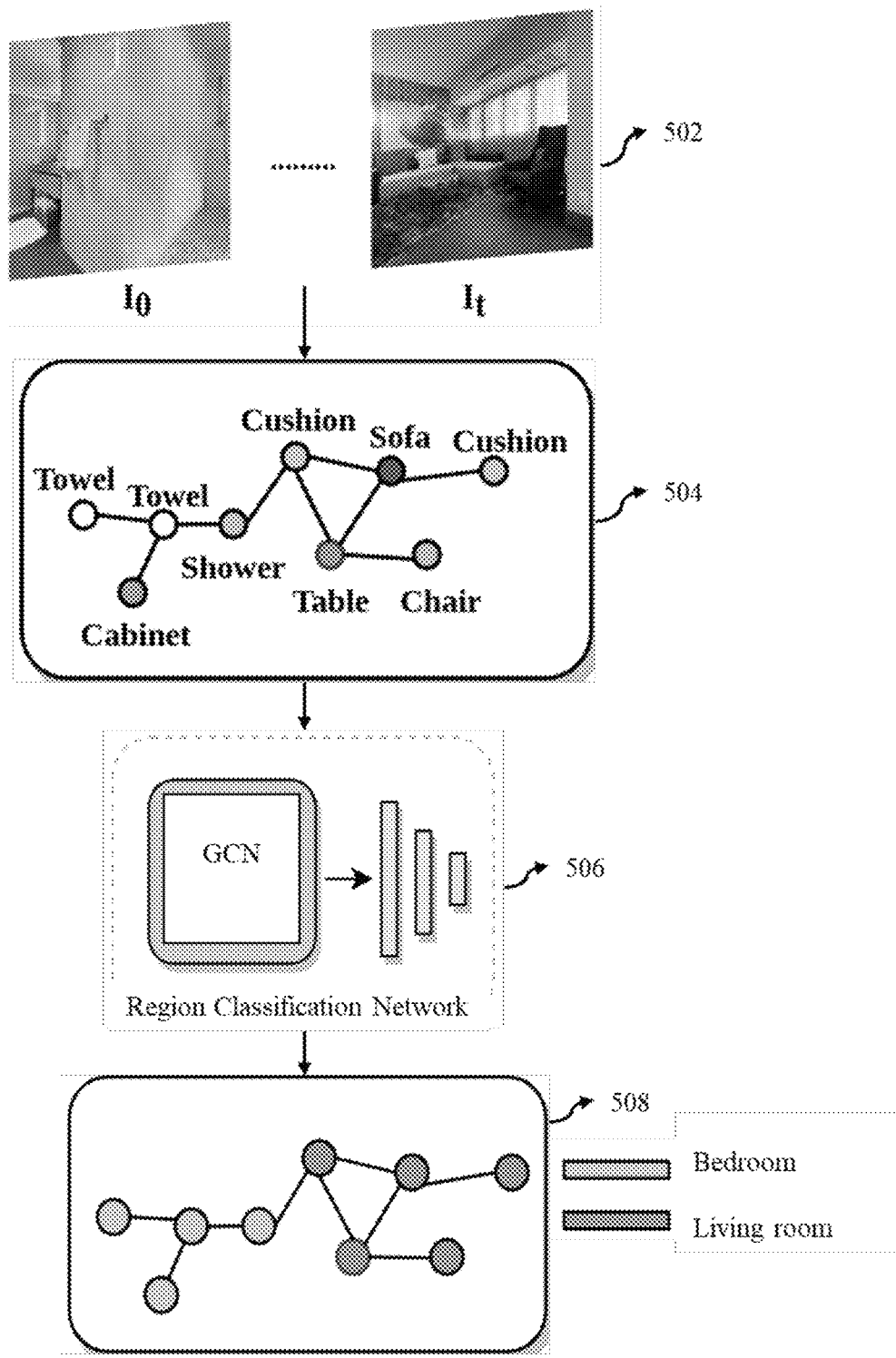
FIG. 5 is a block diagram depicting an example implementation of process illustrated in FIG. 4, according to some embodiments of the present disclosure.

FIG. 4 is a flowchart illustrating process (400) of training a region classification network, according to some embodiments of the present disclosure. FIG. 5 is a block diagram depicting an example implementation of process illustrated in FIG. 4, according to some embodiments of the present disclosure. At step 402 of the process 400 (depicted in block 502), a plurality of sensory inputs ($I_0, I_1, \ldots, I_t$) are obtained from an agent at a plurality of training scenes. In an embodiment, the plurality of sensor inputs may be obtained for a plurality of time instances (0, 1, . . . t). Further, at step

404 of the process 400, a plurality of semantic graphs ($S_1, S_2, \ldots, S_t$) are constructed for each of the plurality of sensor inputs ($I_0, I_1, \ldots, I_t$). In simple words, a semantic graph corresponding to sensor inputs from each training scene is constructed. An example semantic graph is illustrated in block 504. Further, at step 406 of the process 400 ((illustrated by block 506), a neural network is trained using the plurality of semantic graphs ($S_1, S_2, \ldots, S_t$) to obtain the region classification network. The region classification network provides region class probability vector, $p_r$, for each node, and the highest probability region class for each node as shown in block 508. In an embodiment, the neural network comprises a Graph Convolutional Network (GCN) followed by fully connected layers. Input to the neural network is the plurality of semantic graphs ($S_1, S_2, \ldots, S_t$) wherein each of the plurality of semantic graphs are represented as—(i) a feature vector matrix $Y \in \mathbb{R}^{N \times N_D}$ for node representation wherein N is the number of nodes in the semantic graph $S_t$. For each node n, input feature vector $y_n \in \mathbb{R}^{N_D}$ is a one hot encoding of its object category wherein $N_D$ is number of object categories; and (ii) an adjacency matrix $A \in \mathbb{R}^{N \times N}$ representing the graph structure. During training, for each node of each of the plurality of semantic graphs, a single convolution operation in the GCN aggregates features of the node's immediate neighbors into node feature vector. The transformed node feature vectors from the GCN are passed through fully connected layers. The neural network is trained in an end-to-end supervised manner to regress the probability of each node in the semantic graph belonging to each of the $N_R$ region classes. Parameters of the deep neural network are updated using stochastic gradient descent. The supervised loss function used in training the deep neural network is defined according to equation 3.

$$L_{sup} = \Sigma_{j=1}^{N_b} \Sigma_{i=1}^{N} f(\widehat{p_r}, p_r) \tag{3}$$

wherein $N_b$ is mini-batch size, N is the number of nodes in the semantic graph, $\widehat{p_r}$ and $p_r$ are predicted and ground truth region class probabilities respectively for each node in the semantic graph and $f(\cdot,\cdot)$ is the cross entropy loss function. The ground truth region class probability vector ($p_r$) for a node is a one-hot encoding of the region the node belongs to.

Figure 6:
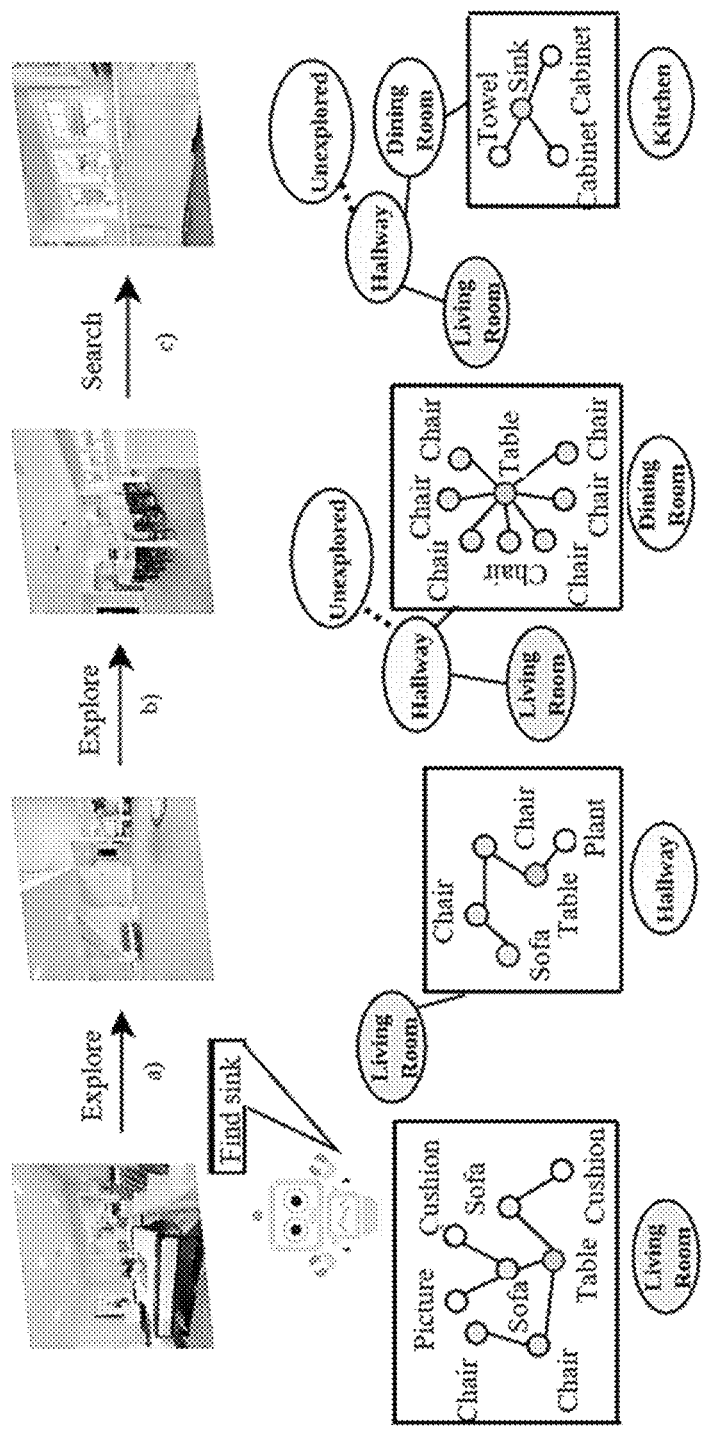
FIG. 6 is a block diagram depicting an example implementation of the method illustrated in FIG. 3, according to some embodiments of the present disclosure.

FIG. 6 is a block diagram depicting an example implementation of method illustrated in FIG. 3, according to some embodiments of the present disclosure. Here, the agent has to navigate towards a sink i.e. sink is the goal. While exploring the environment, it builds a semantic graph of objects that it encounters and uses the semantic graph to identify different semantic regions in the environment using the region classification network. As the agent moves from living room to hallway, it identifies dining room where the sink is highly likely to occur. The agent continues to navigate until sink is reached or for pre-defined number of time instances.

EXPERIMENTS

In this section, the implementation of method of present disclosure, training and validation procedure, and comparison of method of present disclosure against well-established exploration techniques on various evaluation criteria are described.

Dataset: The training and validation scenes are part of the Matterport3D (MP3D) dataset (A. Chang, A. Dai, et al., "Matterport3d: Learning from rgb-d data in indoor environments," International Conference on 3D Vision (3DV), 2017.) and Habitat simulator (M. Savva, A. Kadian, et al., "Habitat: A platform for embodied ai research," in Proceedings of the IEEE/CVF International Conference on Computer Vision, 2019, pp. 9339-9347) is used for the experiments. MP3D consists of photo-realistic indoor 3D environments along with object-level semantic annotations. The training dataset consists of 10 MP3D scenes and the method of present disclosure is validated on 1500 episodes (6 MP3D scenes, 250 episodes for each scene). The training and validation scenes are chosen such that they reflect the complexity of the train-val split provided in the Habitat Object-Goal Navigation challenge (D. Batra, A. Gokaslan, et al., "Objectnav revisited: On evaluation of embodied agents navigating to objects," arXiv preprint arXiv:2006.13171, 2020.). MP3D provides hierarchical annotations for each object-object's region class and object's level. These hierarchical annotations are used to generate the ground truth labels to train the region classification network.

Implementation details: 1) Region Classification Network—The deep neural network architecture consists of 3 GCN layers and 3 fully connected layers. PyTorch Geometric (M. Fey and J. E. Lenssen, "Fast graph representation learning with PyTorch Geometric," in ICLR Workshop on Representation Learning on Graphs and Manifolds, 2019.) is used to implement graph convolutional layers. The region classification network is trained with 200,000 graphs and a batch size of 256. Adam optimizer is used with a learning rate of 0.0003 and a discount factor of 0.99. For the graph construction, less important semantic classes like windows, curtains, doors, etc are ignored. These classes do not appear as goal categories either. As defined in (D. Batra, A. Gokaslan, et al., "Objectnav revisited: On evaluation of embodied agents navigating to objects," arXiv preprint arXiv:2006.13171, 2020.), the number of object categories ND are considered as 21. Similarly, the number of region classes NR are considered as 10. Region classes that occur in very few scenes are clubbed together with those commonly occurring region classes which have similar object composition.

2) Object Goal Navigation: The sensor inputs consist of RGBD images of size 4×256×256, odometry sensor readings with position and orientation of the agent with respect to the starting frame, and semantic image of size 1×256×256 obtained from Habitat's 'Semantic' sensor. The action move_forward takes the agent forward by 0.25 m, turn_left and turn_right adjust the agent's orientation by 10 degrees left and right respectively. When the agent is in sight of the goal G, it executes a series of actions to reach within a threshold distance d (1 m) from G and calls stop action to terminate the episode. The maximum episode length is 350 time-steps.

Evaluation metrics: (1) Success: An episode is termed to be successful if the agent can reach within a threshold distance d (1 m) from the goal G before episode termination (350 timesteps). The Success evaluation metric is defined as the ratio of the number of successful episodes to the total number of episodes. (2) Success weighted by Path Length (SPL): SPL quantifies how efficiently an agent reaches the goal G in a successful episode. This is computed according to equation 4.

$$SPL = \frac{1}{N} \sum_{i=1}^{N} S_i \cdot \frac{l_i}{\max(p_i, l_i)} \tag{4}$$

wherein N is the number of test episodes, $S_i$ is a binary indicator of success, $l_i$ is the length of the shortest path to the closest instance of the goal G from the agent's starting position and pi is the length of the actual path traversed by the agent. SPL ranges from 0 to 1. Higher SPL indicates better model performance for the following reasons—(i) High SPL signifies that the agent trajectory length is comparable to the shortest path from the agent's starting position to the goal. (ii) High SPL also suggests that the agent has reached the closest instance of the goal G from its starting position. (3) SoftSPL: One of the shortcomings of SPL is that it treats all failure episodes equally. This is addressed in the SoftSPL metric by replacing $S_i$, the binary indicator of success, by episode_progress, a continuous indicator. episode_progress ranges from 0 to 1 depending on how close the agent was to the goal G at episode termination. SoftSPL is calculated according to equation 5.

$$SoftSPL = \frac{1}{N}\sum_{i=1}^{N}\left(1 - \frac{d_i}{\max(l_i, d_i)}\right)\left(\frac{l_i}{\max(p_i, l_i)}\right) \quad (5)$$

wherein N is the number of test episodes, $l_i$ is the length of the shortest path to the closest instance of the goal G from the agent's starting position, $p_i$ is the length of the actual path traversed by agent and $d_i$ is the length of the shortest path to the goal from the agent's position at episode termination. Here, the term $$\left(1 - \frac{d_i}{\max(l_i, d_i)}\right)$$

indicates episode_progress. Similar to SPL, higher value of SoftSPL indicates better model performance. (4) Distance To Threshold (DTS): DTS indicates how far the agent is from the success threshold boundary when the episode ends. This is computed according to equation 6.

$$DTS = \max(\|x_T - G\|_2 - d, 0) \quad (6)$$

wherein $\|x_T - G\|_2$ is the L2 distance of the agent from the goal G at the end of episode, and d is the success threshold. A lower DTS value at episode termination indicates that the agent is closer to the goal G. Therefore, a lower DTS value indicates better performance.

Baselines: The method of present disclosure is evaluated qualitatively and quantitatively using a well-established exploration policy—Frontier Based Exploration (B. Yamauchi, "A frontier-based approach for autonomous exploration," in Proceedings 1997 IEEE International Symposium on Computational Intelligence in Robotics and Automation CIRA'97. 'Towards New Computational Principles for Robotics and Automation'. IEEE, 1997, pp. 146-151.; D. Holz, N. Basilico, F. Amigoni, and S. Behnke, "Evaluating the efficiency of frontier-based exploration strategies," in ISR 2010 (41st International Symposium on Robotics) and ROBOTIK 2010 (6th German Conference on Robotics). VDE, 2010, pp. 1-8.) and the state-of-the-art exploration policy—Active Neural Slam (D. S. Chaplot, D. Gandhi, et al., "Learning to explore using active neural slam," in International Conference on Learning Representations (ICLR), 2020.). The baselines considered for evaluation are—(1) Random: In Random baseline, the agent samples an action in a random manner from {move_forward, move_left and move_right} for each time-step. (2) Frontier Based Exploration: A frontier is essentially the boundary between the explored free space and the unexplored space. In Frontier Based Exploration, the agent moves towards sampled points on the frontier. It has been shown that sampling a point closest to the agent provides the best exploration. (3) Frontier Based Exploration+method of present disclosure: Method 300 is implemented by considering frontier based exploration as the goal exploration policy. At any time-step t, the agent moves towards the nearest potential_sub_goal if there is any. Else, the agent moves towards the closest frontier. (4) Active Neural Slam (ANS): In ANS, at any time-step, the agent moves towards a long-term goal that is obtained from its exploration policy. The exploration policy in ANS is trained with an objective to maximize the scene coverage reward. (5) Active Neural Slam (ANS)+method of present disclosure: In this baseline, method of present disclosure is implemented considering ANS as the exploration policy. At any time-step t, the agent moves towards the nearest potential_sub_goal if there is any. Else, the agent moves towards a long-term goal that maximizes scene coverage. In all the baselines except Random, whenever the semantic sensor encounters the goal G, the agent moves towards G to reach within the success threshold boundary d.

Effect of method of present disclosure: The quantitative performance of all baseline methods is summarized in Table I. The random baseline is significant as its DTS value indicates the difficulty of the validation episodes as described in (D. S. Chaplot, D. Gandhi, A. Gupta, and R. Salakhutdinov, "Object goal navigation using goal-oriented semantic exploration," in In Neural Information Processing Systems, 2020.). For the experiments, validation scenes and episodes are chosen such that the difficulty of episodes is similar to Habitat object goal navigation challenge's mini-val episodes in terms of random baseline's DTS value. It can be inferred from Table 1 that the method of present disclosure considerably outperforms the corresponding exploration policies mainly in terms of success and SPL metrics. The improved performance of method of present disclosure also indicates that the region classification network predicts region classes accurately from the semantic graphs. This high level semantic understanding of region classes coupled with prior knowledge of object composition in different region classes has resulted in intelligent exploration to reach the goal G more easily and efficiently.

TABLE 1

| Method | Success | SPL | SoftSPL | DTS |
|---|---|---|---|---|
| Random | 0.006 | 0.0049 | 0.0363 | 6.6547 |
| Frontier based exploration | 0.598 | 0.3703 | 0.3891 | 4.2478 |
| Frontier based exploration + method of present disclosure | 0.6493 | 0.3971 | 0.4130 | 3.6823 |
| Active Neural SLAM | 0.6770 | 0.4954 | 0.5329 | 3.8379 |
| Active Neural SLAM + method of present disclosure | 0.7027 | 0.5160 | 0.5507 | 3.6622 |

Figure 8:
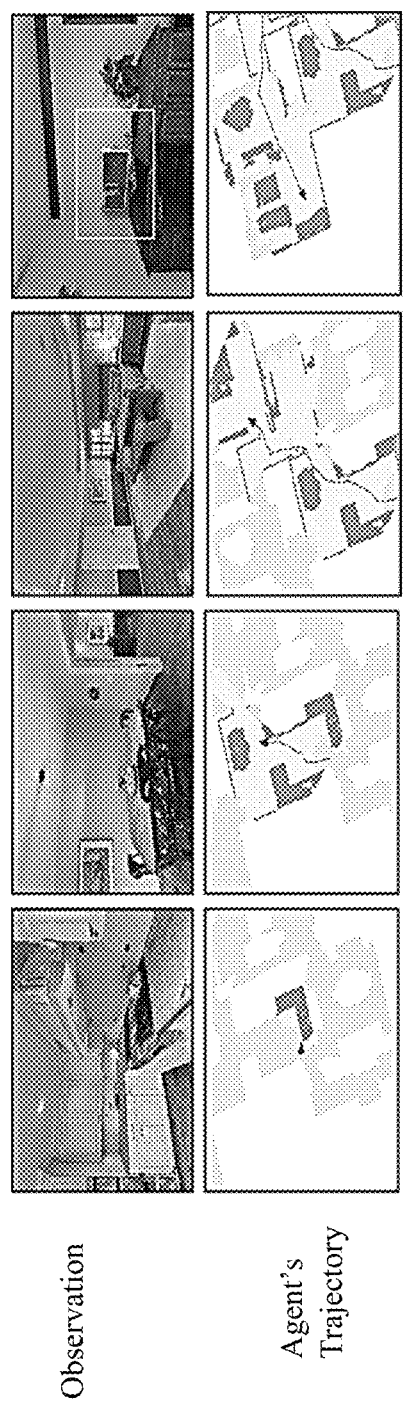
FIG. 8 illustrates images captured by the agent and corresponding spatial occupancy maps for an example implementation of method illustrated in FIG. 2, according to some embodiments of the present disclosure.
Figure 9:
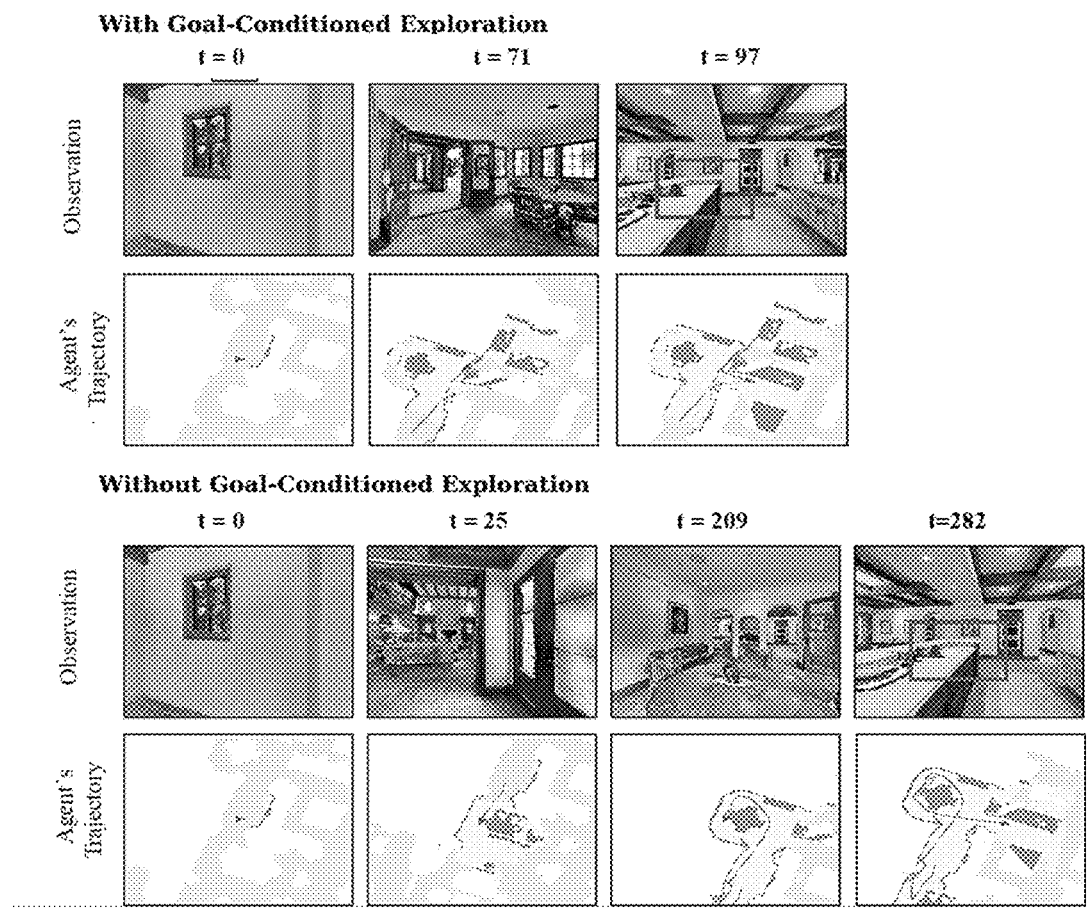
FIG. 9 illustrates a qualitative comparison between Active Neural Slam (ANS) without Goal-Conditioned Exploration and ANS with Goal-Conditioned Exploration, according to some embodiments of the present disclosure.

The performance improvement can also be observed from qualitative results. FIG. 8 shows a complex indoor environment where the agent navigates from the kitchen through multiple region classes to reach the goal tv_monitor. Similarly, FIG. 9 shows the comparison of performance between Active Neural Slam exploration policy and the same policy with method of present disclosure on the same episode. The difference in the agent's trajectories for both approaches is clearly shown. Additionally, the effect of goal-conditioning the exploration policy is evident as the agent avoids exploring regions classes that are less likely to contain the goal G.

Figure 10:
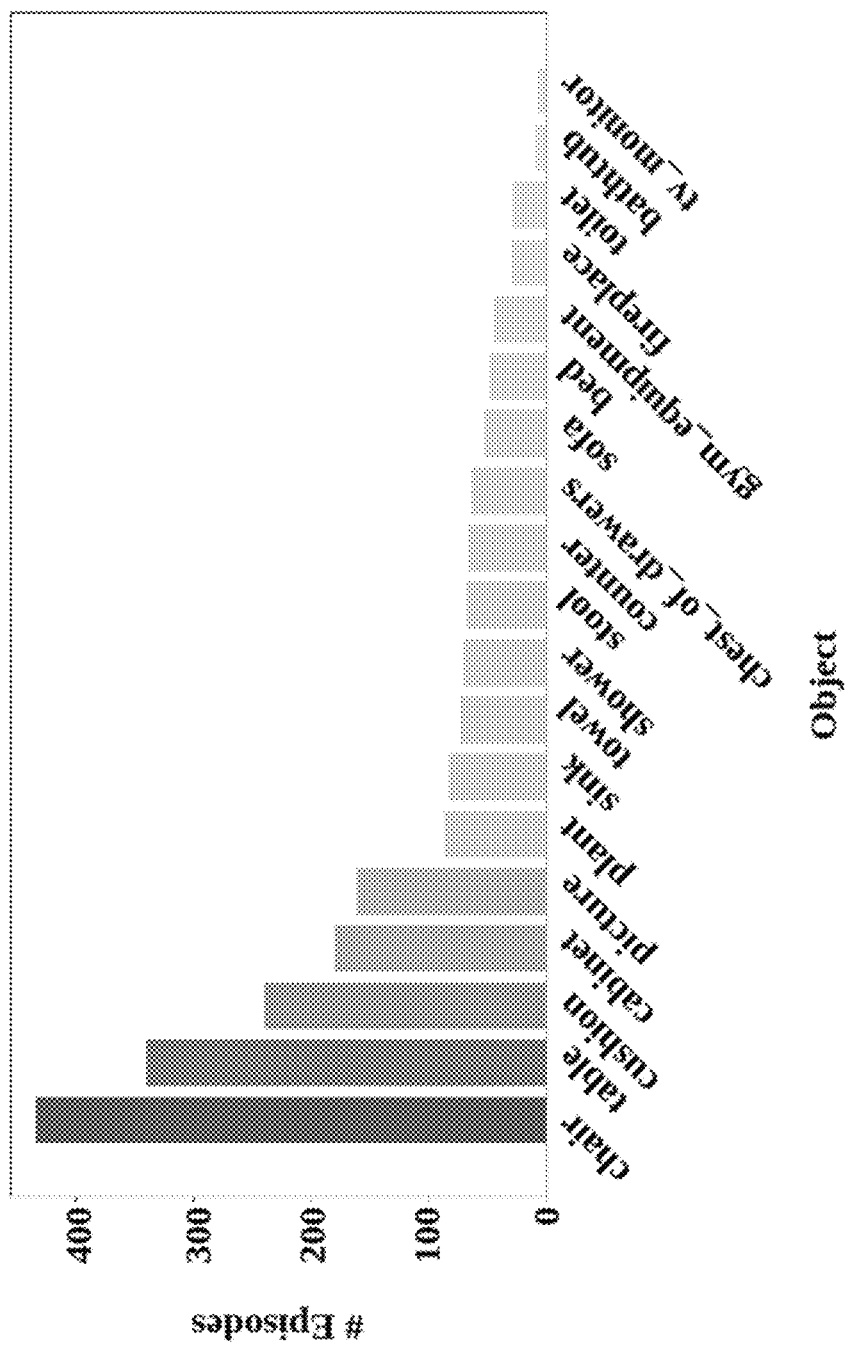
FIG. 10 shows distribution of validation episodes, belonging to the habitat object goal navigation challenge's minival dataset, across all the object categories, according to some embodiments of the present disclosure.

Average category-wise Success (ACS): FIG. 10 shows distribution of validation episodes, belonging to the Habitat Object goal navigation challenge's minival dataset, across all the object categories, according to some embodiments of the present disclosure In an MP3D scene, frequently occurring categories like chair and table have a higher number of validation episodes than less frequently occurring categories like bed and shower. These less frequently occurring categories are predominantly restricted to one region class. For example, the bed occurs only in the bedroom and the shower is present only in the bathroom. The emphasis on scene understanding for a successful episode is more when the goal G is a bed or a shower. A solution to object goal navigation can perform very poorly on episodes with less frequently occurring categories as the goal and still have a high success metric by performing well in a large number of episodes with more frequently occurring categories. To mitigate this bias, a new metric to measure the performance of object goal navigation solutions is proposed—Average category-wise Success (ACS) which is computed according to equation 7.

$$ACS = \frac{1}{N \times N_D} \sum_i^N \sum_j^{N_D} S_j \qquad (7)$$

wherein N is the number of test episodes, ND is the number of object categories, Sj is the category success for each scene. Table 2 provides quantitative comparison of baseline exploration policies with respect to method of present disclosure on the ACS metric.

TABLE 2

| Method | ACS |
| --- | --- |
| Frontier based exploration | 0.486 |
| Frontier based exploration + method of present disclosure | 0.532 |
| Active Neural SLAM | 0.539 |
| Active Neural SLAM + method of present disclosure | 0.595 |

It can be observed from Table 2 that method of present disclosure has higher average category success than the corresponding exploration techniques. This is once again attributed to an accurate understanding of the semantic construct around the agent.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of performing goal conditioned exploration for object goal navigation efficiently and independent of goal exploration policies. This is achieved by first developing scene understanding using a region classification network which takes sensor inputs (object level information) and predicts region level information as output. Further, the object goal navigation is performed by integrating the region classification network and the existing goal exploration policies as described in the present disclosure.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for goal-conditioned exploration for object goal navigation, the method comprising:

receiving, via one or more hardware processors of an agent, an image of a goal and a pre-defined number of time instances within which the agent must reach the goal, wherein the goal refers to an object of interest among a plurality of objects in a plurality of regions within an environment of the agent;

initializing, via the one or more hardware processors, the agent at a random location within a region among the plurality of regions;

constructing, via the one or more hardware processors, a spatial occupancy map and a semantic graph corresponding to the random location; and performing, via the one or more hardware processors, a plurality of steps for (i) each of the pre-defined number of time instances or (ii) until the agent reaches the goal, wherein the plurality of steps comprise:

obtaining a plurality of sensory inputs from a plurality of sensors associated with the agent;

updating the spatial occupancy map and the semantic graph based on the plurality of sensory inputs, wherein the semantic graph comprises one or more objects among the plurality of objects;

predicting a region class probability vector corresponding to each object in the semantic graph using a region classification network, wherein the region class probability vector indicates probability of the object occurring in each of the plurality of regions;

computing a Co-occurrence Likelihood (CL) score for each object in the semantic graph as product of the corresponding region class probability vector and a goal distribution vector, wherein the CL score indicates likelihood of the object and the goal occurring together in a region among the plurality of regions, wherein the goal distribution vector is computed by analyzing distribution of goal in each of the plurality of regions in training scenes, and wherein identified potential sub-goals in the semantic graph have CL score greater than a pre-defined threshold value, wherein the CL score is calculated CL score=$\Sigma_{r=0}^{NR-1} p(o$ in region$[r]) \cdot p(G$ in region$[r])$, wherein region is list of the plurality of regions in the environment, NR is total number of regions, o is object corresponding to which CL score is calculated, and G is the goal, p(o in region[r]) is the region class probability vector corresponding to the object for which CL score is calculated, p(G in region[r]) is the goal distribution vector computed a priori by analyzing distribution of goal G in region[r] based on how many times the goal has occurred in the region, wherein sum of values of the goal distribution vector is always 1 for each object, and number of values in the goal distribution vector is equal to the number of regions in the environment;

identifying if there are any potential sub-goals in the semantic graph based on the CL score; and performing one of—(a) navigating the agent towards closest potential sub-goal among the identified potential sub-goals if one or more potential sub-goals are identified, and (b) navigating the agent towards a long-term goal based on the spatial occupancy map, wherein the long-term goal is selected from an exploration policy.

2. The method of claim 1, wherein the plurality of sensory inputs comprise RGB images of a current location in which the agent is in, sensory inputs from GPS-compass sensor and depth sensor of the agent, and wherein the semantic graph is constructed by considering objects identified from sensory inputs obtained from the agent as nodes and connecting the nodes based on K nearest objects identified by K-Nearest Neighbors (KNN) algorithm, wherein the sensory inputs are obtained by the agent at a current location in which the agent is in.

3. The method as claimed in claim 1, wherein the spatial occupancy map is a grid map comprising a plurality of grid cells corresponding to the plurality of regions in the environment, and wherein the grid cells are marked as occupied or unoccupied based on sensory inputs obtained by the agent at a current location in which the agent is in.

4. The method of claim 1, wherein the region classification network is constructed by:

obtaining a plurality of sensory inputs from the agent at a plurality of training scenes;

constructing a plurality of semantic graphs for each of the plurality of training scenes based on the plurality of sensor inputs; and training a neural network using the plurality of semantic graphs to obtain the region classification network.

5. The method of claim 4, wherein the neural network comprises a Graph Convolutional Network followed by one or more fully connected layers.

6. A system comprising:
a memory storing instructions;
an RGB-D camera;
one or more GPS-compass sensors;
one or more communication interfaces;
one or more depth sensors; and
one or more hardware processors coupled to the memory via the one or more communication interfaces, wherein the one or more hardware processors are configured by the instructions to:

receive an image of a goal and a pre-defined number of time instances within which the agent must reach the goal, wherein the goal refers to an object of interest among a plurality of objects in a plurality of regions within an environment of the agent;

initialize the agent at a random location within a region among the plurality of regions;

construct a spatial occupancy map and a semantic graph corresponding to the random location; and perform a plurality of steps for (i) each of the pre-defined number of time instances or (ii) until the agent reaches the goal, wherein the plurality of steps comprise:

obtaining a plurality of sensory inputs from a plurality of sensors associated with the agent;

updating the spatial occupancy map and the semantic graph based on the plurality of sensory inputs, wherein the semantic graph comprises one or more objects among the plurality of objects;

predicting a region class probability vector corresponding to each object in the semantic graph using a region classification network, wherein the region class probability vector indicates probability of the object occurring in each of the plurality of regions;

computing a Co-occurrence Likelihood (CL) score for each object in the semantic graph as product of the corresponding region class probability vector and a goal distribution vector, wherein the CL score indicates likelihood of the object and the goal occurring together in a region among the plurality of regions, wherein the goal distribution vector is computed by analyzing distribution of goal in each of the plurality of regions in training scenes, and wherein identified potential sub-goals in the semantic graph have CL score greater than a pre-defined threshold value, wherein the CL score is calculated $$CL\ score = \sum_{r=0}^{N_R-1} p(o\ in\ region[r]) \cdot p(G\ in\ region[r]),$$

wherein region is list of the plurality of regions in the environment, $N_R$ is total number of regions, o is object corresponding to which CL score is calculated, and G is the goal, p(o in region[r]) is the region class probability vector corresponding to the object for which CL score is calculated, p(G in region[r]) is the goal distribution vector computed a priori by analyzing distribution of goal G in region[r] based on how many times the goal has occurred in the region, wherein sum of values of the goal distribution vector is always 1 for each object, and number of values in the goal distribution vector is equal to the number of regions in the environment;

identifying if there are any potential sub-goals in the semantic graph based on the CL score; and perform one of—(a) navigating the agent towards closest potential sub-goal among the identified potential sub-goals if one or more potential sub-goals are identified, and (b) navigating the agent towards a long-term goal based on the spatial occupancy map, wherein the long-term goal is selected from an exploration policy.

7. The system of claim 6, wherein the plurality of sensory inputs comprise RGB images of a current location in which the agent is in, sensory inputs from GPS-compass sensor and depth sensor of the agent, and wherein the one or more hardware processors are configured to construct the semantic graph by considering objects identified from sensory inputs obtained from the agent as nodes and connecting the nodes based on K nearest objects identified by K-Nearest Neighbors (KNN) algorithm, wherein the sensory inputs are obtained by the agent at a current location in which the agent is in.

8. The system of claim 6, wherein the spatial occupancy map is a grid map comprising a plurality of grid cells corresponding to the plurality of regions in the environment, and wherein the grid cells are marked as occupied or unoccupied based on sensory inputs obtained by the agent at a current location in which the agent is in.

9. The system of claim 6, wherein the one or more hardware processors are configured to construct the region classification network by:

obtaining a plurality of sensory inputs from the agent at a plurality of training scenes;

constructing a plurality of semantic graphs for each of the plurality of training scenes based on the plurality of sensor inputs; and training a neural network using the plurality of semantic graphs to obtain the region classification network.

10. The system of claim 9, wherein the neural network comprises a Graph Convolutional Network followed by one or more fully connected layers.

11. One or more non-transitory machine-readable information storage mediums comprising one or more instructions which when executed by one or more hardware processors cause:

receiving an image of a goal and a pre-defined number of time instances within which the agent must reach the goal, wherein the goal refers to an object of interest among a plurality of objects in a plurality of regions within an environment of the agent;

initializing the agent at a random location within a region among the plurality of regions;

constructing a spatial occupancy map and a semantic graph corresponding to the random location; and performing a plurality of steps for (i) each of the pre-defined number of time instances or (ii) until the agent reaches the goal, wherein the plurality of steps comprise:

obtaining a plurality of sensory inputs from a plurality of sensors associated with the agent;

updating the spatial occupancy map and the semantic graph based on the plurality of sensory inputs, wherein the semantic graph comprises one or more objects among the plurality of objects;

predicting a region class probability vector corresponding to each object in the semantic graph using a region classification network, wherein the region class probability vector indicates probability of the object occurring in each of the plurality of regions;

computing a Co-occurrence Likelihood (CL) score for each object in the semantic graph as product of the corresponding region class probability vector and a goal distribution vector, wherein the CL score indicates likelihood of the object and the goal occurring together in a region among the plurality of regions, wherein the goal distribution vector is computed by analyzing distribution of goal in each of the plurality of regions in training scenes, and wherein identified potential sub-goals in the semantic graph have CL score greater than a pre-defined threshold value, wherein the CL score is calculated $$CL\ score = \sum_{r=0}^{N_R-1} p(o\ in\ region[r]) \cdot p(G\ in\ region[r]),$$

wherein region is list of the plurality of regions in the environment, $N_R$ is total number of regions, o is object corresponding to which CL score is calculated, and G is the goal, p(o in region[r]) is the region class probability vector corresponding to the object for which CL score is calculated, p(G in region[r]) is the goal distribution vector computed a priori by analyzing distribution of goal G in region[r] based on how many times the goal has occurred in the region, wherein sum of values of the goal distribution vector is always 1 for each object, and number of values in the goal distribution vector is equal to the number of regions in the environment;

identifying if there are any potential sub-goals in the semantic graph based on the CL score; and performing one of—(a) navigating the agent towards closest potential sub-goal among the identified potential sub-goals if one or more potential sub-goals are identified, and (b) navigating the agent towards a long-term goal based on the spatial occupancy map, wherein the long-term goal is selected from an exploration policy.

12. The one or more non-transitory machine-readable information storage mediums of claim 11, wherein the plurality of sensory inputs comprise RGB images of a current location in which the agent is in, sensory inputs from GPS-compass sensor and depth sensor of the agent, and wherein the semantic graph is constructed by considering objects identified from sensory inputs obtained from the agent as nodes and connecting the nodes based on K nearest objects identified by K-Nearest Neighbors (KNN) algorithm, wherein the sensory inputs are obtained by the agent at a current location in which the agent is in.

13. The one or more non-transitory machine-readable information storage mediums of claim 11, wherein the spatial occupancy map is a grid map comprising a plurality of grid cells corresponding to the plurality of regions in the environment, and wherein the grid cells are marked as occupied or unoccupied based on sensory inputs obtained by the agent at a current location in which the agent is in.

14. The one or more non-transitory machine-readable information storage mediums of claim 11, wherein the region classification network is constructed by:
   obtaining a plurality of sensory inputs from the agent at a plurality of training scenes;
   constructing a plurality of semantic graphs for each of the plurality of training scenes based on the plurality of sensor inputs; and
   training a neural network using the plurality of semantic graphs to obtain the region classification network.

15. The one or more non-transitory machine-readable information storage mediums of claim 14, wherein the neural network comprises a Graph Convolutional Network followed by one or more fully connected layers.

* * * * *